(12) United States Patent
Yamaguchi et al.

(10) Patent No.: US 6,625,524 B2
(45) Date of Patent: Sep. 23, 2003

(54) HYBRID VEHICLE CONTROL APPARATUS AND CONTROL METHOD

(75) Inventors: Kozo Yamaguchi, Anjo (JP); Kenji Gotou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/835,399

(22) Filed: Apr. 17, 2001

(65) Prior Publication Data

US 2001/0034572 A1 Oct. 25, 2001

(30) Foreign Application Priority Data

Apr. 24, 2000 (JP) .................................. 2000-122500

(51) Int. Cl.⁷ .................................................. B60L 9/00
(52) U.S. Cl. ........................................................ 701/22
(58) Field of Search ..................... 701/22, 51, 41–42, 701/53–56, 67–69, 87–89, 93–95, 99–104, 110; 180/242, 245, 260–261, 65.1, 65.6; 477/41, 43, 46, 48, 62, 65, 69, 73, 77–80; 290/27–28, 36 R, 38 R, 38 B, 38 E, 40 R, 40 A

(56) References Cited

U.S. PATENT DOCUMENTS

| | | | |
|---|---|---|---|
| 5,558,589 A | | 9/1996 | Schmidt |
| 5,735,770 A | * | 4/1998 | Omote et al. ................ 477/5 |
| 5,899,286 A | | 5/1999 | Yamaguchi |
| 5,907,191 A | * | 5/1999 | Sasaki et al. ............... 290/19 |
| 5,931,757 A | | 8/1999 | Schmidt |
| 5,976,054 A | * | 11/1999 | Yasuoka ..................... 477/48 |
| 6,087,734 A | | 7/2000 | Maeda et al. |

FOREIGN PATENT DOCUMENTS

| | | |
|---|---|---|
| DE | 199 25 229 A 1 | 6/1999 |
| EP | 0 830 969 A2 | 3/1998 |
| EP | 0 937 600 A2 | 8/1999 |
| FR | 2 774 040 | 7/1999 |

OTHER PUBLICATIONS

Amano et al (US application Publication No. US 2001/0017227).*

* cited by examiner

*Primary Examiner*—Thu Nguyen
(74) *Attorney, Agent, or Firm*—Oliff & Berridge, PLC

(57) ABSTRACT

A hybrid vehicle control apparatus, in a vehicle having an engine; a first electric motor and a second electric motor; an output shaft connected to a drive wheel; a differential gear device whose gear elements are connected to the engine, the first and second electric motors, and the output shaft, respectively, has a generated control torque calculation processing device for calculating a control torque generated in association with an electrical control of the second electric motor; an inertia torque calculation processing device for calculating inertia torques; a target control torque calculation processing device for calculating a control torque serving as a target; and a torque control processing device for performing a torque control of the first electric motor in accordance with the control torque serving as the target. As a result, the control torque can be calculated without being affected by inertia torques, so that the drive feeling of the hybrid type vehicle does not deteriorate.

19 Claims, 13 Drawing Sheets

| | |
|---|---|
| 1ST MOTOR 16 | R2 |
| OUTPUT SHAFT 14 | R1, CR2 |
| ENGINE 11 | CR1, S2 |
| 2ND MOTOR 25 | S1 |

| | |
|---|---|
| 1ST MOTOR 16 | R2 |
| OUTPUT SHAFT 14 | R1, CR2 |
| ENGINE 11 | CR1, S2 |
| 2ND MOTOR 25 | S1 |

HYBRID VEHICLE CONTROL APPARATUS AND CONTROL METHOD

BACKGROUND OF THE INVENTION

1. Field of Invention

The invention relates to a control apparatus and a control method for a hybrid vehicle.

2. Description of Related Art

A split, hybrid vehicle has been conventionally provided in which an engine, two electric motors, and a planetary gear unit, as a differential gear device, are provided. Three gear elements of the planetary gear unit are connected to the engine, one of the electric motors and an output shaft, respectively, and the other electric motor and the output shaft are connected (see Japanese Patent Application Laid-Open No. HEI 10-98805).

For example, when an accelerator pedal is depressed so that the rotation of one gear element of the various gear elements of the planetary gear unit changes, the rotation speed of one of the electric motors changes. Therefore, a design is provided such that a target motor torque of the other electric motor is set, taking the inertial torque of the one of the electric motors into consideration. Hence, the drive feeling of the hybrid type vehicle can be improved.

However, in the aforementioned conventional hybrid type vehicle, more specifically, in the case of a split, hybrid vehicle in which the planetary gear unit has four gear elements, and the gear elements are connected to the engine, the two electric motors, and the output shaft, respectively, the drive feeling of the hybrid type vehicle deteriorates, for example, in a situation where, when the accelerator pedal is depressed so that one of the gear elements of the planetary gear unit, for example, the gear element connected to the engine, changes in rotation speed, the two motors, which change in rotation speed with changes in the rotation speed of the gear element, are not properly controlled.

SUMMARY OF THE INVENTION

Accordingly, it is an object of the invention to provide a control apparatus and a control method for a hybrid type vehicle, more specifically, a split, hybrid vehicle in which a differential gear device has four gear elements that are connected to an engine, two electric motors, and an output shaft, respectively, the control apparatus and method avoiding deterioration in the drive feeling of the hybrid vehicle when the rotation of a gear element of the gear elements of the differential gear device changes.

To achieve the aforementioned and other objects, a hybrid vehicle control apparatus in accordance with the invention includes an engine; first and second electric motors; an output shaft connected to a drive wheel; a differential gear device having at least four gear elements that are connected to the engine, the first and second electric motors, and the output shaft, respectively; generated control torque calculation processing means for calculating a control torque generated in association with an electrical control of the second electric motor; inertia torque calculation processing means for calculating first and second inertia torques occurring in association with changes in motor rotation speeds of the first and second electric motors; target control torque calculation processing means for calculating a control torque serving as a target for performing an electrical control of the first electric motor, based on the control torque and the first and second inertia torques; and torque control processing means for performing a torque control of the first electric motor in accordance with the control torque serving as the target.

Another hybrid vehicle control apparatus in accordance with the invention includes an engine; first and second electric motors; an output shaft connected to a drive wheel; a differential gear device having at least four gear elements that are connected to the engine, the first and second electric motors, and the output shaft, respectively; generated control torque calculation processing means for calculating a control torque generated in association with an electrical control of the second electric motor; inertia torque calculation processing means for calculating a first inertia torque that occurs in rotational elements from a rotor of the first electric motor to a gear element of the differential gear device in association with a change in a motor rotation speed of the first electric motor, and a second inertia torque that occurs in rotational elements from a rotor of the second electric motor to a gear element of the differential gear device in association with a change in a motor rotation speed of the second electric motor; target control torque calculation processing means for calculating a control torque serving as a target for performing an electrical control of the first electric motor, based on the control torque and the first and second inertia torques; and torque control processing means for performing a torque control of the first electric motor in accordance with the control torque serving as the target.

Still another hybrid vehicle control apparatus in accordance with the invention includes an engine; first and second electric motors; an output shaft connected to a drive wheel; a differential gear device having at least four gear elements that are connected to the engine, the first and second electric motors, and the output shaft, respectively; target output torque calculation processing means for calculating a target output torque of an output torque outputted to the output shaft; generated control torque calculation processing means for calculating a control torque generated in association with an electrical control of the second electric motor; inertia torque calculation processing means for calculating first and second inertia torques occurring in association with changes in motor rotation speeds of the first and second electric motors; target control torque calculation processing means for calculating, based on the control torque and the first and second inertia torques, a control torque serving as a target for performing an electrical control of the first electric motor such that the target output torque is generated; and torque control processing means for performing a torque control of the first electric motor in accordance with the control torque serving as the target.

A yet another hybrid vehicle control apparatus in accordance with the invention includes an engine; first and second electric motors; an output shaft connected to a drive wheel; a differential gear device having at least four gear elements that are connected to the engine, the first and second electric motors, and the output shaft, respectively; target output torque calculation processing means for calculating a target output torque of an output torque outputted to the output shaft; generated control torque calculation processing means for calculating a control torque generated in association with an electrical control of the second electric motor; inertia torque calculation processing means for calculating a first inertia torque that occurs in rotational elements from a rotor of the first electric motor to a gear element of the differential gear device in association with a change in a motor rotation speed of the first electric motor, and a second inertia torque that occurs in rotational elements from a rotor of the second electric motor to a gear element of the differential gear device in association with a change in a motor rotation speed of the second electric motor; target control torque calculation processing means for calculating, based on the control torque and the first and second inertia torques, a control torque serving as a target for performing an electrical control of the first electric motor such that the target output torque is generated; and torque control processing means for performing a torque control of the first electric motor in accordance with the control torque serving as the target.

The hybrid vehicle control apparatus of the invention may further include target engine revolution speed calculation processing means for calculating a target engine revolution speed of the engine; and rotation speed control processing means for performing a rotation speed control of the second electric motor such that an engine revolution speed becomes equal to the target engine revolution speed.

In the hybrid vehicle control apparatus of the invention, if the target engine revolution speed is NE* and the vehicle speed is V, a target motor rotation speed NM2* may be given as:

$$NM2^* = K1 \cdot NE^* - K2 \cdot V \text{ (K1, K2: constants)}.$$

In the hybrid vehicle control apparatus of the invention, the first inertia torque may be calculated by multiplying an inertia moment of a rotor of the first electric motor by an angular acceleration of the first electric motor, and the second inertia torque may be calculated by multiplying an inertia moment of a rotor of the second electric motor by an angular acceleration of the second electric motor.

In the hybrid vehicle control apparatus of the invention, the first inertia torque may be a sum of values obtained by multiplying inertia moments of the rotational elements from the rotor of the first electric motor to the gear element of the differential gear device by angular accelerations of the rotational elements, respectively, and the second inertia torque may be a sum of values obtained by multiplying inertia moments of the rotational elements from the rotor of the second electric motor to the gear element of the differential gear device by angular accelerations of the rotational elements, respectively.

In the hybrid vehicle control apparatus of the invention, if the control torque generated in association with the electrical control of the second electric motor is TM2#, the first inertia torque is IM1, the second inertia torque is IM2, and the target output torque is TO*, the target motor torque TM1* may be given as:

$$TM1^* = K3(TM2\# + IM2) - K4 \cdot TO^* - IM1 \text{ (K3, K4: constants)}$$

A hybrid type vehicle control method in accordance with the invention is applied to a hybrid vehicle that has an engine; first and second electric motors; an output shaft connected to a drive wheel; and a differential gear device having at least four gear elements that are connected to the engine, the first and second electric motors, and the output shaft, respectively.

In the method, a control torque generated in association with an electrical control of the second electric motor is calculated. First and second inertia torques occurring in association with changes in motor rotation speeds of the first and second electric motors are calculated. A control torque serving as a target for performing an electrical control of the first electric motor is calculated based on the control torque and the first and second inertia torques. A torque control of the first electric motor is performed in accordance with the control torque serving as the target.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Embodiments of the invention will be described in detail hereinafter with reference to the drawings.

Figure 1:
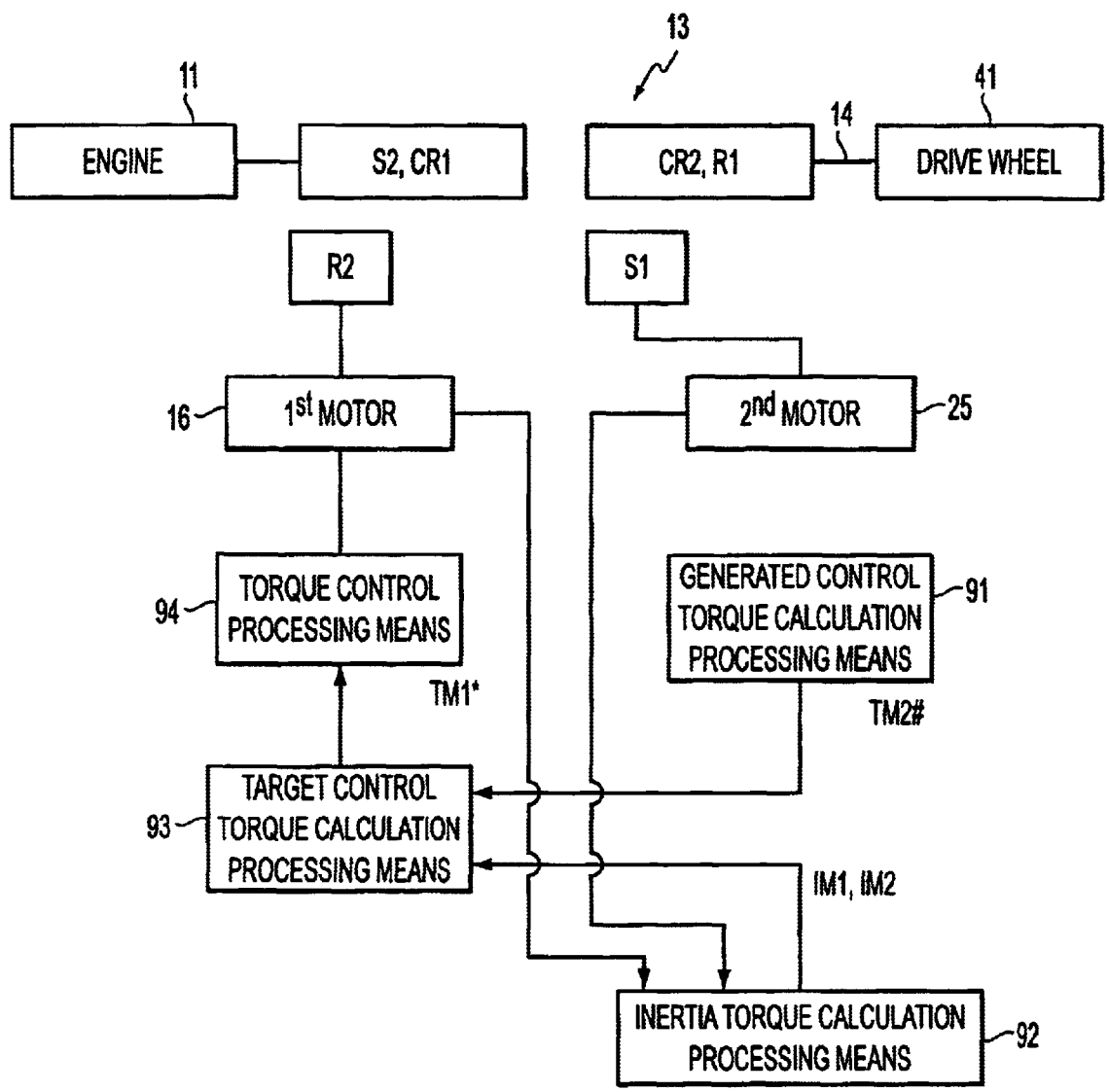
FIG. 1 is a function block diagram of a control apparatus of a hybrid type vehicle in accordance with a first embodiment of the invention.

FIG. 1 is a function block diagram of a hybrid type vehicle control apparatus in accordance with a first embodiment of the invention.

In the drawing, reference numeral 11 represents an engine; 16 represents a first electric motor; 25 represents a second electric motor; 14 represents an output shaft connected to drive wheels 41; 13 represents a planetary gear unit as a differential gear device having at least four gear elements, that is, a sun gear S1, a sun gear S2 and a carrier CR1, a ring gear R2, and a carrier CR2 and a ring gear R1, wherein the sun gear S2, the ring gear R2, the sun gear S1 and the carrier CR2 are connected to the engine 11, the first electric motor 16, the second electric motor 25 and the output shaft 14, respectively; 91 represents a generated control torque calculation processing means for calculating a motor torque TM2# that is a control torque generated in association with an electrical control of the second electric motor 25; 92 represents an inertia torque calculation processing means for calculating first and second inertia torques IM1, IM2 generated in association with changes in motor rotation speeds NM1, NM2 of the first and second electric motors 16, 25; 93 represents a target control torque calculation processing means for calculating a target motor torque TM1* that is a control torque serving as a target for performing an electrical control of the first electric motor 16, based on the motor torque TM2# and the first and second inertia torques IM1, IM2; and 94 represents a torque control processing means for performing a torque control of the first electric motor 16 in accordance with the target motor torque TM1*.

Figure 2:
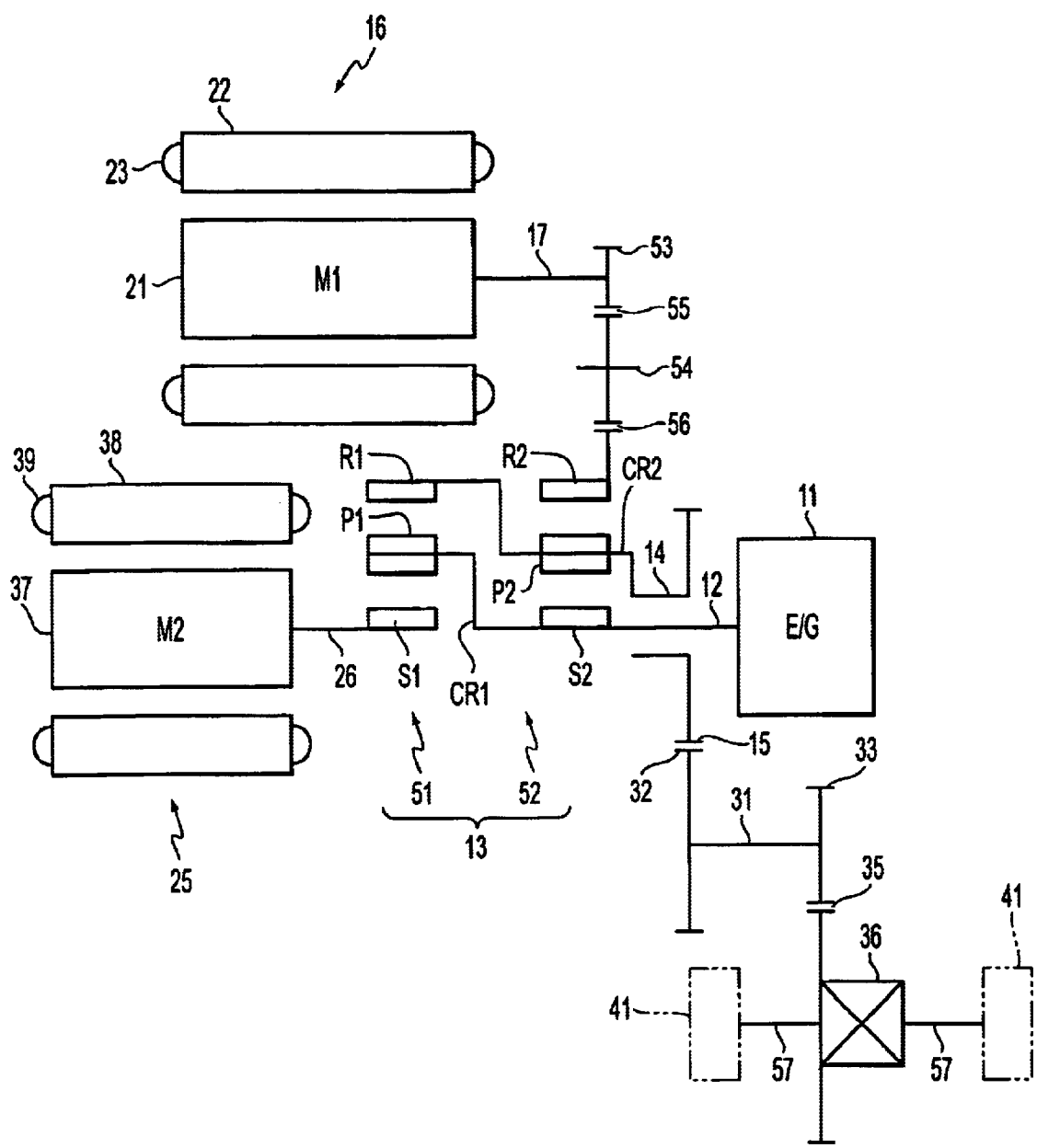
FIG. 2 is a conceptual diagram of the hybrid type vehicle in the first embodiment of the invention.

FIG. 2 is a conceptual diagram of a hybrid type vehicle in the first embodiment of the invention.

In the drawing, 11 represents the engine (E/G); 13 represents the planetary gear unit as a differential gear device having first and second planetary sets 51, 52; 14 represents the output shaft of the planetary gear unit 13; 15 represents a counter drive gear provided on the output shaft 14; 16 represents the first electric motor (M1); and 25 represents the second electric motor (M2). The output shaft 14 is connected to the drive wheels 41.

The first planetary set 51 is made up of the sun gear S1, pinions P1 meshed with the sun gear S1, the ring gear R1 meshed with the pinions P1, and the carrier CR1 rotatably supporting the pinions P1. The second planetary set 52 is made up of the sun gear S2, pinions P2 meshed with the sun gear S2, the ring gear R2 meshed with the pinions P2, and the carrier CR2 rotatably supporting the pinions P2. In the planetary gear unit 13, the carrier CR1 and the sun gear S2 are interconnected, and the ring gear R1 and the carrier CR2 are interconnected. The sun gear S1, the carrier CR1 and the ring gear R1 constitute three gear elements. The sun gear S2, the carrier CR2 and the ring gear R2 constitute three gear elements.

The engine 11 is connected with the sun gear S2 and the carrier CR1, that is, a first gear element. The first electric motor 16 is connected with the ring gear R2, that is, a second gear element. The second electric motor 25 is connected with the sun gear S1, that is, a third gear element. The output, or drive, shaft 14 is connected with the carrier CR2 and the ring gear R1, that is, a fourth gear element.

For the aforementioned connections, the engine 11, the first electric motor 16 and the second electric motor 25 are provided with an output shaft 12, an output shaft 17 and a transmission shaft 26, respectively. The output shaft 12 is connected to the sun gear S2. The output shaft 17 is connected to the ring gear R2 via a drive gear 53 mounted on the output shaft 17, a counter gear 55 that is disposed rotatably relative to a counter shaft 54 and that is meshed with the drive gear 53, and a driven gear 56 mounted on the ring gear R2. The transmission shaft 26 is connected to the sun gear S1.

The first electric motor 16 is substantially made up of a rotor 21 that is fixed to the output shaft 17 and that is rotatably disposed, a stator 22 disposed around the rotor 21, and coils 23 wound on the stator 22. The coils 23 are connected to a battery (not-shown) that is provided as an electricity storage member. The first electric motor 16 is driven by current supplied from the battery, and generates and outputs rotation to the output shaft 17. Although this embodiment employs the battery as an electricity storage member, it is also possible to use a capacitor, a flywheel, a pressure accumulator, etc., instead of the battery.

The second electric motor 25 is substantially made up of a rotor 37 that is fixed to the transmission shaft 26 and that is rotatably disposed, a stator 38 disposed around the rotor 37, and coils 39 wound on the stator 38. The coils 39 are connected to the battery. The second electric motor 25 generates electric power from rotation inputted via the transmission shaft 26, and thereby supplies current to the battery. Furthermore, the second electric motor 25 is driven by current supplied from the battery, and thereby generates and outputs rotation to the transmission shaft 26.

In order to rotate the drive wheels 41 in the same direction as revolution of the engine 11, a counter shaft 31 is provided. A counter driven gear 32 and a pinion drive gear 33 are fixed to the counter shaft 31. The counter driven gear 32 and a counter drive gear 15 are meshed so that rotation is transmitted from the counter drive gear 15 to the counter driven gear 32 while the rotating direction is reversed.

A large ring gear 35 is fixed to a differential device 36. The large ring gear 35 is meshed with the pinion drive gear 33. Therefore, rotation transmitted to the large ring gear 35 is distributed and transmitted to the drive wheels 41 by the differential device 36 via drive shafts 57.

Figure 3:
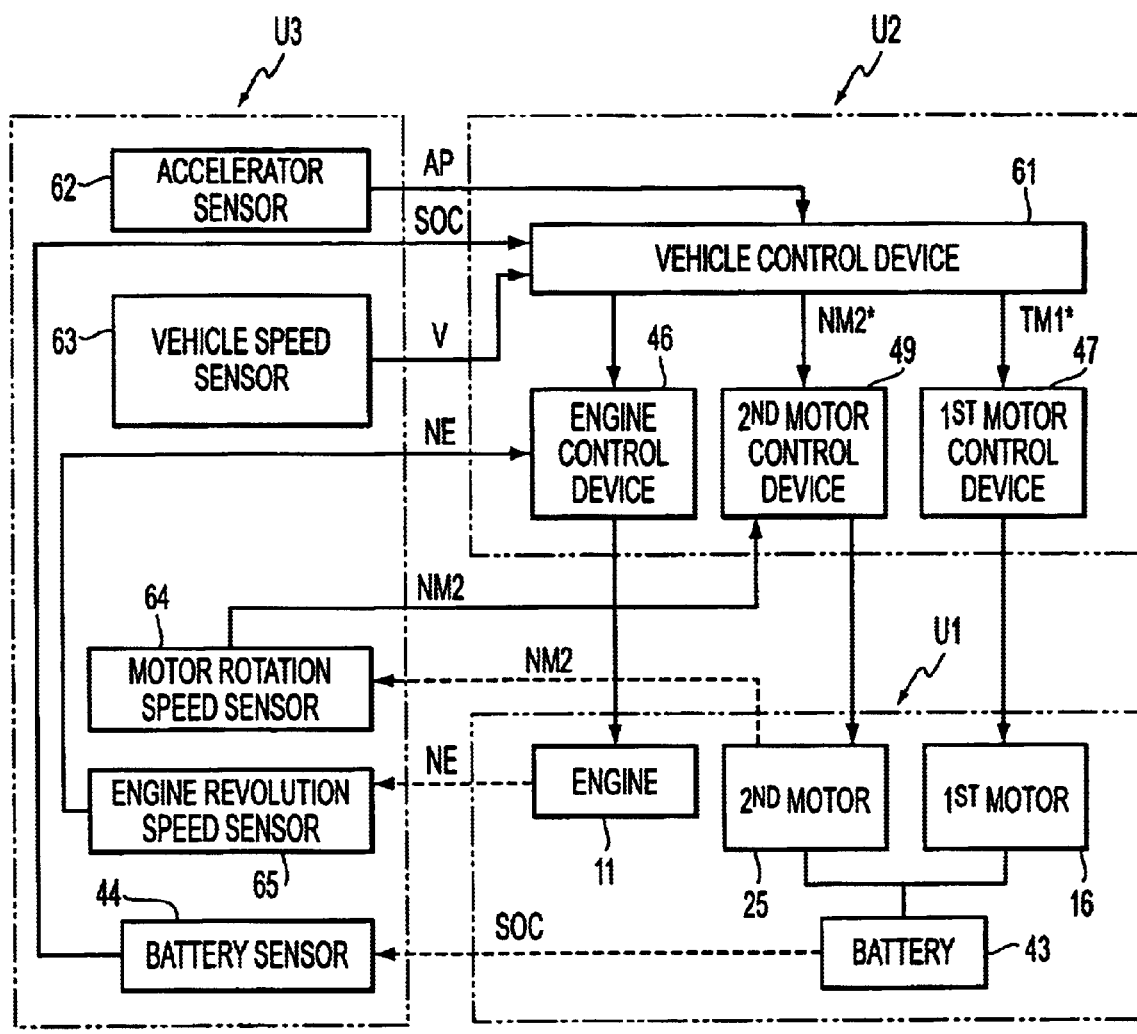
FIG. 3 is a block diagram of a control circuit of the hybrid type vehicle in the first embodiment of the invention.
Figure 4:
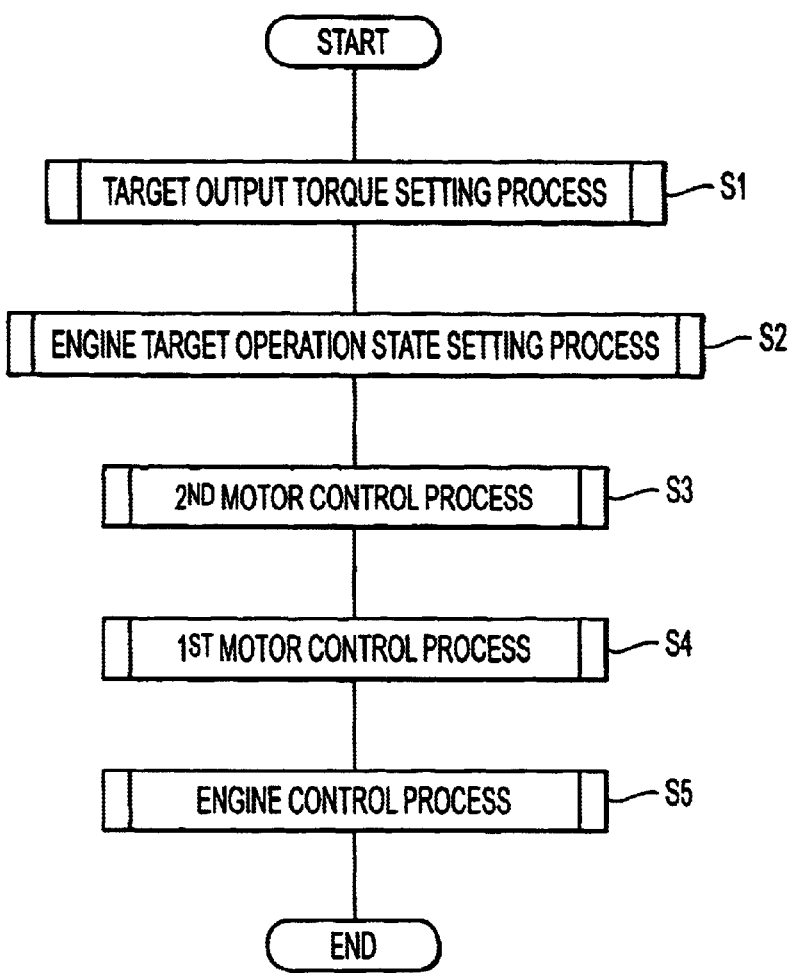
FIG. 4 is a main flow chart illustrating an operation of the hybrid type vehicle in the first embodiment of the invention.
Figure 5:
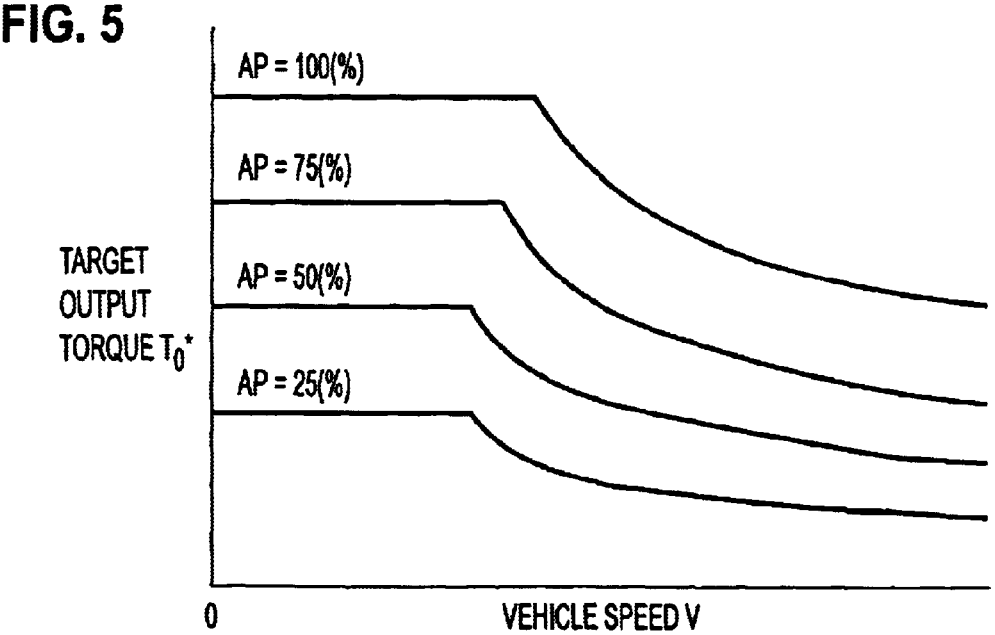
FIG. 5 is a diagram indicating a target output torque map regarding a drive shaft in the first embodiment of the invention.
Figure 6:
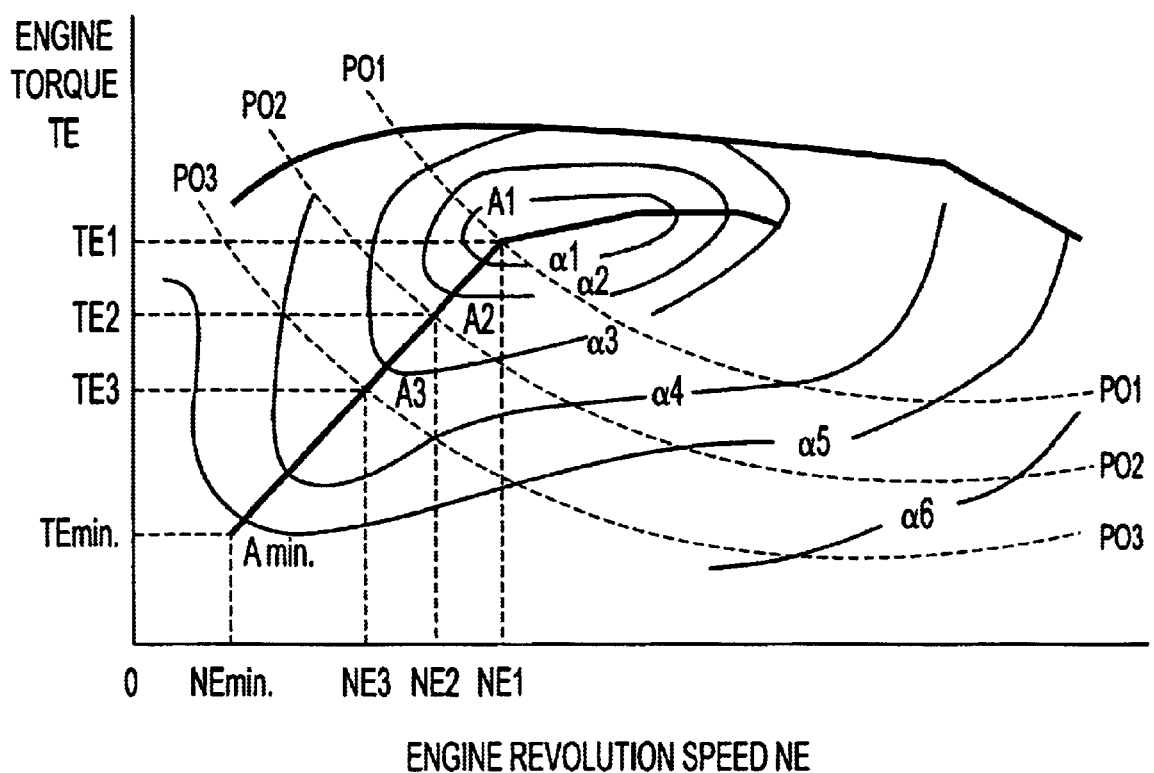
FIG. 6 is a diagram indicating an engine target operation state map in the first embodiment of the invention.
Figure 7:
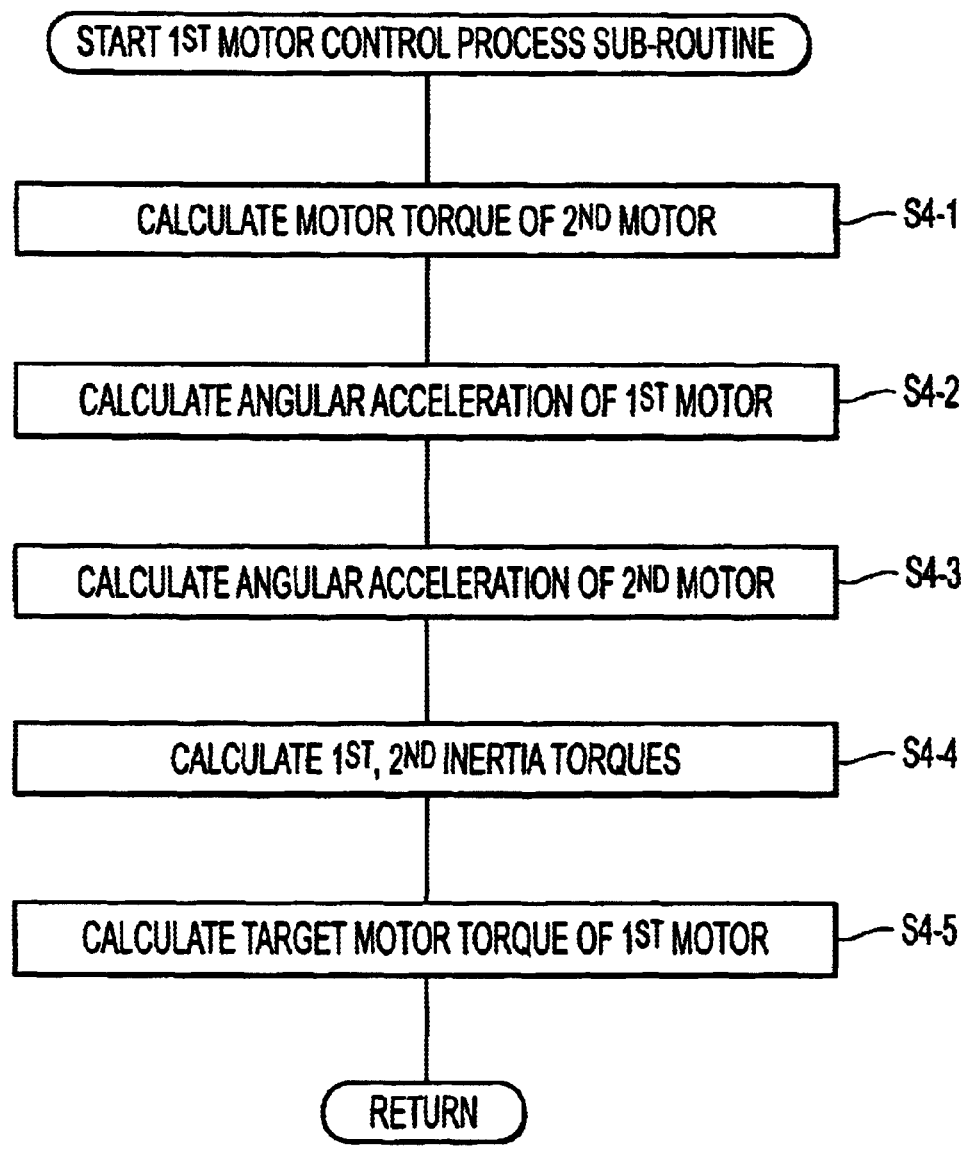
FIG. 7 is a diagram showing a sub-routine of a first motor control process in the first embodiment of the invention.
Figure 8:
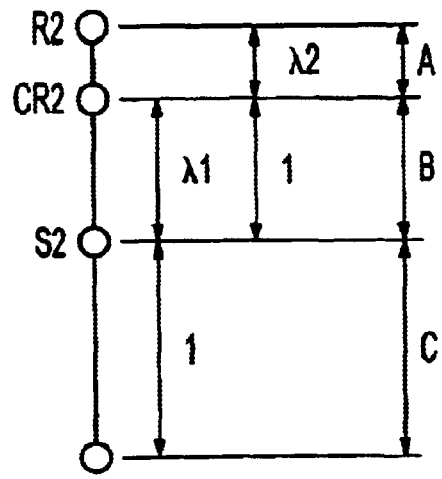
FIG. 8 is a conceptual diagram of a planetary gear unit in the first embodiment of the invention.
Figure 9:
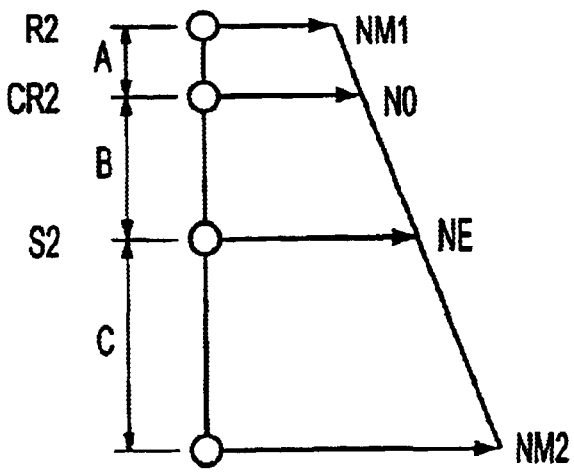
FIG. 9 is a rotation speed diagram in connection with start of the vehicle in the first embodiment of the invention.

The operation of the hybrid vehicle structured as described above will now be described. FIG. 3 is a block diagram of a control circuit of the hybrid vehicle in a first embodiment of the invention. FIG. 4 is a main flowchart illustrating an operation of the hybrid vehicle in the first embodiment of the invention. FIG. 5 is a diagram indicating a target output torque map regarding a drive shaft in the first embodiment of the invention. FIG. 6 is a diagram indicating an engine target operation state map in the first embodiment of the invention. FIG. 7 is a chart illustrating a sub-routine of a first motor control process in the first embodiment of the invention. FIG. 8 is a conceptual diagram of the planetary gear unit in the first embodiment of the invention. FIG. 9 is a diagram indicating rotational speeds at the time of a vehicle start in the first embodiment of the invention.

In FIG. 5, the horizontal axis indicates the vehicle speed V, and the vertical axis indicates the target output torque TO, that is, the target output torque TO*. In FIG. 6, the horizontal axis indicates the engine revolution speed NE, and the vertical axis indicates the engine torque TE.

In FIG. 3, U1 represents a drive section; U2 represents a control section; and U3 represents a sensor section. The engine 11, the first and second electric motors 16, 25, and a battery 43 are disposed in the drive section U1. Disposed in the control section U2 are a vehicle control device 61 formed by a CPU for performing overall control of the hybrid type vehicle, an engine control device 46 for controlling the engine 11, a first motor control device 47 for controlling the first electric motor 16, a second motor control device 49 for controlling the second electric motor 25, and a memory (not-shown) provided as storage means.

Disposed in the sensor section U3 are a battery sensor 44 provided as a remaining stored electricity detecting means for detecting the remaining battery amount SOC as the remaining amount of electricity stored in the battery 43; an accelerator sensor 62 disposed on an accelerator pedal (not-shown) for detecting the amount of accelerator operation AP, that is, the amount of depression of the accelerator pedal; a vehicle speed sensor 63 provided as a vehicle speed detecting means for detecting the vehicle speed V; a motor rotation speed sensor 64 provided as a motor rotation speed detecting means for detecting the rotation speed of the second electric motor 25, that is, the motor rotation speed NM2; and an engine revolution speed sensor 65 provided as an engine revolution speed detecting means for detecting the revolution speed of the engine 11, that is, the engine revolution speed NE. The amount of accelerator operation AP and the remaining battery amount SOC are sent to the vehicle control device 61. The motor rotation speed NM2 is sent to the second motor control device 49. The engine revolution speed NE is sent to the engine control device 46. The motor rotation speed sensor 64 is disposed facing the transmission shaft 26. The engine revolution speed sensor 65 is disposed facing the output shaft 12.

In the hybrid type vehicle structured as described above, a target output torque setting processing means MS1 (not-shown) of the vehicle control device 61 performs a target output torque setting process. The means MS1 reads the amount of accelerator operation AP and the vehicle speed V and, with reference to a target output torque map, as shown in FIG. 5, thereby sets a target output torque TO* corresponding to the amount of accelerator operation AP and the vehicle speed V.

Subsequently, an engine target operation state setting processing means MS2 performs an engine target operation state setting process. Based on the target output torque TO* and the vehicle speed V, the means MS2 calculates a drive force (power) needed to output the target output torque TO* to the drive shafts 57, that is, the needed drive power PO, as in the following expression, and thereby sets an engine target operation state:

$$PO=TO^* \cdot V.$$

Next, the engine target operation state setting processing means MS2 reads the remaining battery amount SOC, and adds a correction drive power Ph to the needed drive power PO corresponding to the remaining battery amount SOC, thereby correcting the needed drive power PO. The corrected needed drive power PO' is given as:

$$PO'=PO+Ph.$$

If the remaining battery amount SOC is small, the needed drive power PO is increased (Ph>0) in order to cause the first electric motor 16 to generate electric power and charge the battery 43 by supplying current thereto. If the remaining battery amount SOC is great, the needed drive power PO is reduced (Ph<0) so that electric power is consumed by supplying current from the battery 43 to the second electric motor 25.

Subsequently, a target engine revolution speed calculation processing means and a target engine torque calculation processing means of the engine target operation state setting processing means MS2 refer to an engine target operation state map stored in the memory, as shown in FIG. 6, and sets highly efficient points A1 to A3, $A_{min}$ of engine operation points PO1—PO1 to PO3—PO3 as an engine target operation state, sets target engine revolution speeds NE1 to NE3 in the engine target operation state as a target engine revolution speed NE*, and calculates engine torques TE1 to TE3 in the engine target operation state as a target engine torque TE*, so that the aforementioned needed drive power PO' is outputted from the engine 11, that is, the drive power calculated by multiplying the engine torque TE and the engine revolution speed NE becomes equal to the needed drive power PO'.

In the engine target operation state map, the engine operation points PO1—PO1 to PO3—PO3 are points where the drive power calculated by multiplying the engine torque TE and the engine revolution speed NE is constant, and α1 to α6 indicate points where the efficiency of the engine 11 is constant. Furthermore, if the engine torque TE and the engine revolution speed NE are at most $TE_{min}$ and $NE_{min}$ respectively, in the engine target operation state map, the target engine revolution speed NE* and the target engine torque TE* are set to 0 (zero) and therefore the engine 11 is stopped.

A second motor control processing means MS3 (not-shown) of the vehicle control device 61 performs a second motor control process. The means MS3 sends a target motor rotation speed NM2* to the second motor control device 49.

Referring to FIG. 8, if the number of teeth of the sun gear S1 of the first planetary set 51 of the planetary gear unit 13 is represented by ZS1 and the number of teeth of the ring gear R1 thereof is represented by ZR1, the ratio λ1 of the number of teeth ZS1 to the number of teeth ZR1 is given as:

$$\lambda 1 = ZS1/ZR1.$$

If the number of teeth of the sun gear S2 of the second planetary set 52 of the planetary gear unit 13 is represented by ZS2 and the number of teeth of the ring gear R2 thereof is represented by ZR2, the ratio λ2 of the number of teeth ZS2 to the number of teeth ZR2 is given as:

$$\lambda 2 = ZS2/ZR2.$$

Provided that the ratio of the rotation speed of the carrier CR2 to the rotation speed of the ring gear R2 is represented by A:

$$A=1,$$

and that the ratio of the rotation speed of the carrier CR1 and the sun gear S2 to the rotation speed of the ring gear R1 and the carrier CR2 is represented by B, and that the ratio of the rotation speed of the sun gear S1 to the rotation speed of the carrier CR1 and the sun gear S2 is represented by C, the ratios B, C are given as:

$$B=\lambda 1;$$

$$C=\lambda 1 \cdot \lambda 2.$$

As can be understood from the rotation speed diagram shown in FIG. 9, if among the rotation speed of the first electric motor 16, that is, the motor rotation speed NM1, and the rotation speed of the output shaft 14, that is, the output rotation speed NO, and the engine revolution speed NE, and the motor rotation speed NM2, two rotation speeds are found, then the other two rotation speeds can be calculated based on simple proportional equations.

For example, if the engine revolution speed NE and the output rotation speed NO are found, the motor rotation speed NM2 can be calculated as in:

$$NM2=((C+B)/B)NE-(C/B)NO.$$

Assuming that the vehicle speed V is determined from the rotation speed of wheels, for example, the drive wheels 41, and that the gear ratio of a path from the planetary gear unit 13 to the drive wheel 41 is GO, the output rotation speed NO is given as:

$$NO=V \cdot GO.$$

Therefore, the motor rotation speed NM2 becomes:

$$NM2=((C+B)/B)NE-(C/B)V \cdot GO$$

Therefore, based on the vehicle speed V, and the target engine revolution speed NE* calculated by the engine target operation state setting processing means MS2, the second motor control processing means MS3 calculates a target motor rotation speed NM2 of the second electric motor 25, that is, a target motor rotation speed NM2*, by the following equation. The second motor control processing means MS3 sends the target motor rotation speed NM2* to the second motor control device 49.

$$NM2^* = ((C+B)/B)NE^* - (C/B)V \cdot GO$$
$$= K1 \cdot NE^* - K2 \cdot V,$$

where K1, K2 are constants, and the constants K1, K2 are:

$$K1 = (C+B)/B;$$
$$K2 = (C/B)GO.$$

A rotation speed control processing means (not-shown) of the second motor control device 49 performs a rotation speed control of the second electric motor 25 as an electrical control so that the motor rotation speed NM2 detected by the motor rotation speed sensor 64 becomes equal to the target motor rotation speed NM2*. That is, the current supplied to the second electric motor 25 is feedback-controlled so that a deviation ΔNM2 between the motor rotation speed NM2 and the target motor rotation speed NM2* becomes 0.

When the engine 11 is started while the hybrid vehicle is traveling at a predetermined vehicle speed V, the target engine revolution speed NE* is rapidly raised as the engine 11 is started, because the engine revolution speed NE before the start of the engine 11 is 0. In that case, the target motor rotation speed NM2* greatly changes, so that a shock occurs in the hybrid vehicle.

Therefore, when the engine 11 is started, the target engine revolution speed NE* is changed stepwise. Likewise, when the engine 11 is stopped, the target engine revolution speed NE* is changed stepwise to 0.

For example, when the accelerator pedal is depressed during a travel of the hybrid type vehicle, the rotation of the carrier CR1 and the sun gear S2 of the planetary gear unit 13 changes. Because the amount of accelerator operation AP changes at this time, the target output torque TO* is changed. In association with changes in the target output torque TO*, the drive power PO is changed. With the changes in the drive power PO, the target engine revolution speed NE* is changed, and the target motor rotation speed NM2* is changed. Therefore, a rotation speed control can be performed such that the motor rotation speed NM2 of the second electric motor 25 becomes equal to the target motor rotation speed NM2*.

The sun gear S2, the ring gear R2, the sun gear S1 and the carrier CR2 of the planetary gear unit 13 are connected to the engine 11, the first and second electric motors 16, 25 and the output shaft 14, respectively. Therefore, if the motor torque TM1 is not properly controlled when the motor rotation speed NM2 changes in association with execution of the rotation speed control of the second electric motor 25, the output torque TO of the hybrid type vehicle cannot be brought to the target output torque TO*, so that the drive feeling of the hybrid type vehicle deteriorates.

Therefore, when the second motor control process ends, a first motor control processing means MS4 (not-shown) of the vehicle control device 61 executes a first motor control process to control the motor torque TM1.

The motor torque TM1 generated by the first electric motor 16 can be calculated as in the following torque balance equation based on the motor torque TM2 and the output torque TO, taking the planetary gear unit 13 into consideration:

$$TM1 = (C/(A+B))TM2 - (B/(A+B))TO \qquad (1).$$

The motor torques TM1, TM2 and the output torque TO assume positive values if they are generated in such a direction as to act on the planetary gear unit 13 when the engine 11 is driven. While the rotation speed control is being executed in the second electric motor 25, the value of current supplied to the second electric motor 25, that is, the value of the current, and the motor torque TM2 generated by the second electric motor 25 are in proportion.

It is conceivable that the value of the current of the second electric motor 25 is detected by a current sensor (not-shown), and that a motor torque TM2 is calculated from the value of the current, and that a target motor torque TM1*, that is, a control torque serving as a target for an electrical control of the first electric motor 16, is calculated from the calculated motor torque TM2 and the target output torque TO*.

In this case, as the rotation speed of the first electric motor 16 changes, a first inertia torque IM1 is generated by inertia moments of the rotating elements from the rotor 21 to the ring gear R2, that is, the rotor 21, the output shaft 17, the drive gear 53, the counter shaft 54, the counter gear 55, the driven gear 56, and the ring gear R2. As the rotation speed of the second electric motor 25 changes, a second inertia torque IM2 is generated by inertia moments of the rotating elements from the rotor 37 to the sun gear S1, that is, the rotor 37, the transmission shaft 26, and the sun gear S1. Therefore, the target motor torque TM1* cannot be accurately calculated using equation (1).

Therefore, the target motor torque TM1* is corrected in accordance with the amounts of the first and second inertia torques IM1, IM2.

To that end, a generated control torque calculation processing means 91 (FIG. 1) of the first motor control processing means MS4 calculates a motor torque TM2# as a control torque generated by the second electric motor 25, based on the value of the current of the second electric motor 25.

Next, a motor rotation speed calculation processing means of the first motor control processing means MS4 reads the motor rotation speed NM2 detected by the motor rotation speed sensor 64, and the engine revolution speed NE detected by the engine revolution speed sensor 65. Based on the motor rotation speed NM2 and the engine revolution speed NE, the motor rotation speed calculation processing means calculates a motor rotation speed NM1. Based on the motor rotation speed NM1, the means calculates an angular acceleration dωM1 of the first electric motor 16. In this case, the gear ratio GM1 of the power transmission path from the first electric motor 16 to the planetary gear unit 13 is taken into account for the calculation of the motor rotation speed NM1.

As described above, if two rotation speeds among the motor rotation speed NM1, the output rotation speed NO, the engine revolution speed NE and the motor rotation speed NM2 are found, the other two rotation speeds can be calculated based on simple proportional equations. Thus, it is possible to calculate the motor rotation speed NM1 based on the motor rotation speed NM2 and the vehicle speed V, or to calculate the motor rotation speed NM1 based on the engine revolution speed NE and the vehicle speed V. In this case, the gear ratio GM0 of a power transmission path from the planetary gear unit 13 to the drive wheel 41 is taken into consideration.

An inertia torque calculation processing means 92 of the first motor control processing means MS4 calculates an angular acceleration dωM2 of the second electric motor 25 based on the motor rotation speed NM2. Subsequently, the inertia torque calculation processing means 92 calculates a first inertia torque IM1 based on the angular acceleration dωM1 and the inertia moment ImM1 of the first electric motor 16 as in:

$$IM1 = ImM1 \cdot d\omega M1.$$

The inertia torque calculation processing means 92 also calculates a second inertia torque IM2 based on the angular acceleration dωM2 and the inertia moment ImM2 of the second electric motor 25 as in:

$$IM2 = ImM2 \cdot d\omega M2.$$

In this case, the first electric motor 16, the drive gear 53, the counter gear 55 and the ring gear R2 vary in angular acceleration from one another. Therefore, as the inertia moment ImM1, an equivalent inertia moment of the power transmission path is used, and the inertia moment ImM1 is calculated as in:

$$ImM1 = ImM1' + ImCG \cdot GM1' + ImR2 \cdot GM1,$$

where ImM1' is the inertia moment of the rotor 21, the output shaft 17 and the drive gear 53; ImCG is the inertia moment of the counter shaft 54; ImR2 is the inertia moment of the driven gear 56 and the ring gear R2; and GM1' is the gear ratio between the drive gear 53 and the counter shaft 54.

In this embodiment, the first inertia torque IM1 is calculated based on the angular acceleration dωM1 and the inertia moment ImM1, and the second inertia torque IM2 is calculated based on the angular acceleration dωM2 and the inertia moment ImM2. However, it is also possible to calculate the first inertia torque IM1 based on the sum of the values obtained by multiplying the inertia moments of the rotor 21, the output shaft 17, the drive gear 53, the counter gear 55, and the ring gear R2 by their angular accelerations, respectively, and to calculate the second inertia torque IM2 based on the sum of the values obtained by multiplying the inertia moments of the rotor 37, the transmission shaft 26 and the sun gear S1 by their angular accelerations, respectively. Furthermore, it is also possible to calculate the first inertia torque IM1 based on only the inertia moment of the rotor 21, which has the greatest mass, and to calculate the second inertia torque IM2 based on only the inertia moment of the rotor 37, which has the greatest mass.

When the first and second inertia torques IM1, IM2 are found, the motor torques TM1, TM2 can be calculated by the following equations:

$$TM1 = (TM1^* + IM1)GM1; \text{ and}$$

$$TM2 = TM2\# + IM2.$$

The output torque TO outputted to the output shaft 14 is given as:

$$TO = TO^*/GO$$

Therefore, equation (1) can be converted into equation (2), taking the first and second inertia torques IM1, IM2 into consideration:

$$(TM1^* + IM1)GM1 = (C/(A+B))(TM2\# + IM2) - (B/(A+B))TO^*/GO \quad (2).$$

Then, the target motor torque TM1* is given as:

$$TM1^* = (C/GM1(A+B))(TM2\# + IM2) - (B/(GM1 \cdot GO(A+B)))TO^* - IM1 = K3(TM2\# + IM2) - K4 \cdot TO^* - IM1 \quad (3),$$

where K3, K4 are constants, and the constants K3, K4 are:

$$K3 = C/(GM1(A+B)); \text{ and}$$

$$K4 = B/(GM1 \cdot GO(A+B)).$$

A target control torque calculation processing means 93 of the first motor control processing means MS4 calculates a target motor torque TM1* based on equation (3) so that the target output torque TO* is generated, and sends the target motor torque TM1* to the first motor control device 47. Because it is a precondition that the target output torque TO* in equation (3) assumes a negative value at the time of driving the motor in connection with the torque balance equation, it is necessary to reverse the sign of the target output torque TO* set by the target output torque setting processing means MS1 before substitution in equation (3). A torque control processing means 94 of the first motor control device 47, upon receiving the target motor torque TM1*, performs a torque control of the second electric motor 25 such that the target motor torque TM1* is outputted. To that end, the torque control processing means 94 refers to a torque-current value map (not-shown) stored in the memory, and reads out a value of current corresponding to the target motor torque TM1*, and supplies a current of that value to the first electric motor 16.

When the first motor control process ends, an engine control processing means MS5 (not-shown) of the vehicle control device 61 performs an engine control process. The means MS5 refers to a torque-fuel injection amount map, a torque-throttle opening degree map and the like (not shown) stored in the memory, and reads out an amount of fuel injected, a degree of throttle opening and the like corresponding to the target engine torque TE*, and sends the amount of fuel injected, the degree of throttle opening and the like to the engine control device 46, so that the target engine torque TE* is outputted. Upon receiving the amount of fuel injected, the degree of throttle opening and the like, the engine control device 46 controls the amount of fuel injected, the degree of throttle opening and the like.

Because the target motor torque TM1* is corrected by amounts corresponding to the first and second inertia torques IM1, IM2 in this manner, the target motor torque TM1* can be calculated without being affected by the first and second inertia torques IM1, IM2 occurring in association with changes in the rotation speed of the first and second electric motors 16, 25.

Therefore, when the rotation of a gear element of the gear elements of the planetary gear unit 13 changes, the output torque TO can be brought to the target output torque TO*, and fluctuations in the output torque TO can be reduced. Hence, the drive feel of the hybrid type vehicle does not deteriorate.

The flowchart of FIG. 4 will next be described. In step S1, the target output torque setting processing means MS1 performs the target output torque setting process. In step S2, the engine target operation state setting processing means MS2 performs the engine target operation state setting process followed by step S3 in which the second motor control processing means MS3 performs the second motor control process. Then, in step S4, the first motor control processing means MS4 performs the first motor control process and, finally, in step S5, the engine control processing means MS5 performs the engine control process, and the procedure ends.

Using the flowchart of FIG. 7, the first motor 16 control process sub-routine will next be described. In step S4-1, the control motor torque TM2# of the second electric TM2# motor 25 is calculated. Then, in step S4-2, the angular acceleration dωM1 of the first electric motor 16 is calculated and in step S4-3, the angular acceleration dωM2 of the second electric motor 25 is calculated. Following this, in step S4-4, the first and second inertia torques IM1, IM2 are calculated and then, in step S4-5, the target motor torque TM1* of the first electric motor 16 is calculated, following which the procedure returns.

Figure 10:
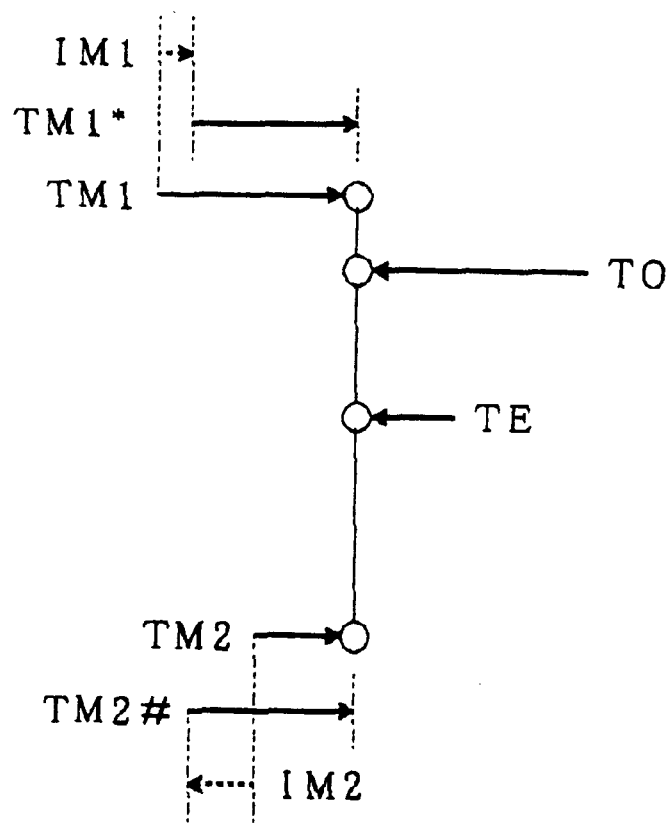
FIG. 10 is a torque diagram in connection with start of the engine in the first embodiment of the invention.

A torque diagram and a rotation speed diagram in connection with start of the engine will be described. FIG. 10 is a torque diagram for the start of the engine in the first embodiment of the invention and FIG. 11 is a rotation speed diagram associated with start of the engine in accordance with the first embodiment of the invention.

Figure 11:
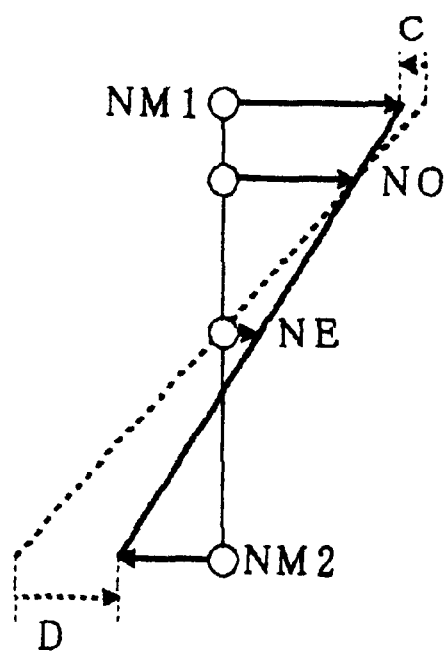
FIG. 11 is a rotation speed diagram in connection with start of the engine in the first embodiment of the invention.

When the hybrid type vehicle is driven by driving the first electric motor 16 while holding the engine 11 (FIG. 2) in a stopped state, the rotation speed line becomes as indicated by the broken line in FIG. 11, so that the motor rotation speed NM1 and the output rotation speed NO assume positive values, the engine revolution speed NE is 0, and the motor rotation speed NM2 assumes a negative value. If, in this state, the engine 11 is started so that the rotation speed line becomes as indicated by the solid line in FIG. 11, the motor rotation speeds NM1, NM2 become lower as indicated by broken-line arrows C, D so that the engine revolution speed NE assumes a positive value. At this time, the output rotation speed NO is hardly changed by the inertia torque of the hybrid type vehicle. Further, the planetary gear unit 13 receives the motor torques TM1, TM2, and receives the output torque TO and the engine torque TE as reaction forces, as indicated in FIG. 10.

The motor torque TM1 assumes a value obtained by adding the first inertia torque IM1 to the target motor torque TM1*. The motor torque TM2 assumes a value obtained by subtracting the second inertia torque IM2 from the control motor torque TM2#. In this case, the direction in which the motor torque TM2 acts on the planetary gear unit 13 is different than the direction of the motor rotation speed NM2, so that the second electric motor 25 generates electric power.

Figure 12:
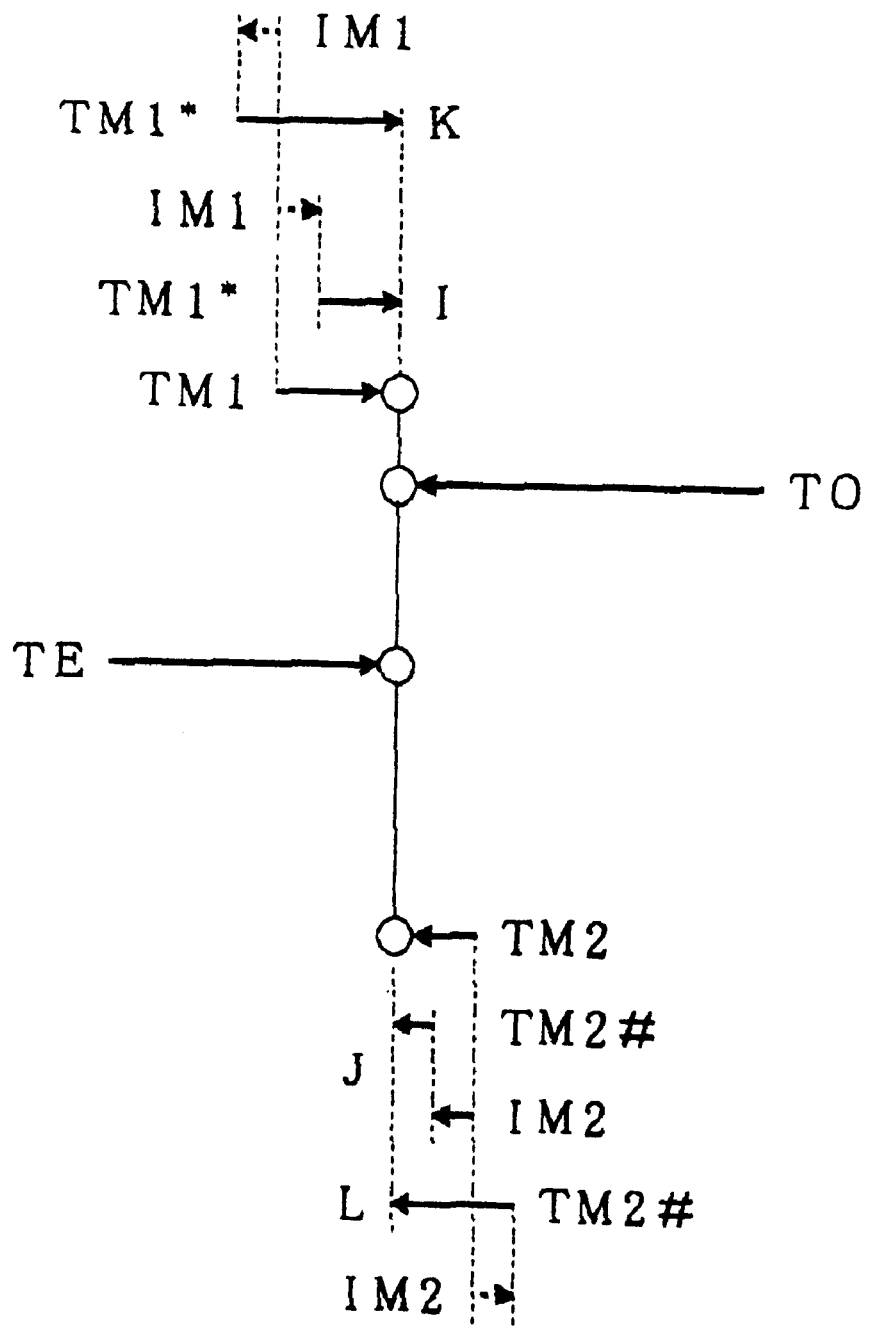
FIG. 12 is a torque diagram in connection with split-driving in the first embodiment of the invention.
Figure 13:
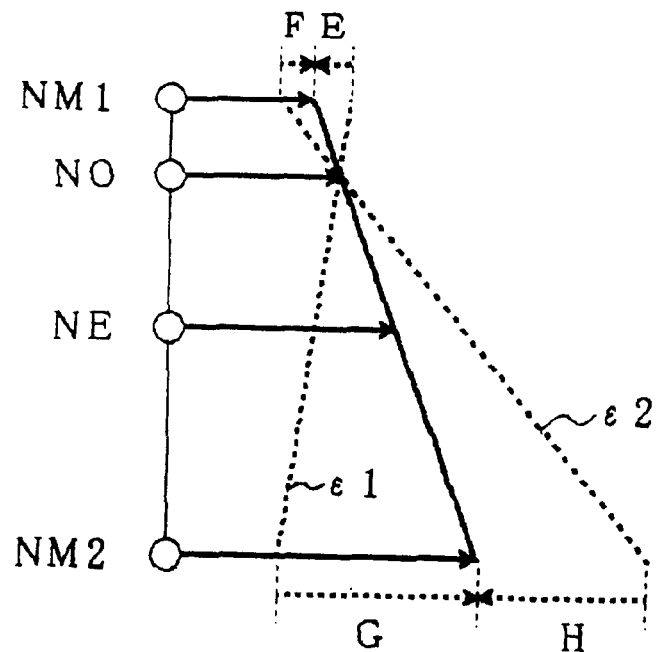
FIG. 13 is a rotation speed diagram in connection with split-driving in the first embodiment of the invention.

Next to be described is a torque diagram and a rotation speed diagram in connection with the case where the hybrid vehicle is split-driven, with the engine 11 being driven. FIG. 12 is a torque diagram in connection with split driving in accordance with the first embodiment of the invention. FIG. 13 is a rotation speed diagram in connection with split driving in accordance with the first embodiment of the invention.

When the hybrid type vehicle is split-driven by driving the engine 11 (FIG. 2) and the first electric motor 16, the rotation speed line becomes as indicated by one of two broken lines ϵ1, ϵ2 in FIG. 13, so that the motor rotation speeds NM1, NM2, the output rotation speed NO and the engine revolution speed NE assume positive values.

If from the state indicated by the broken line ϵ1 in FIG. 13, the engine revolution speed NE is increased by depressing the accelerator pedal (not-shown) so that the rotation speed becomes as indicated by the solid line in FIG. 13, the motor rotation speed NM1 is lowered as indicated by a broken-line arrow E, and the motor rotation speed NM2 is increased as indicated by a broken-line arrow G, as the output rotation speed NO is not changed by the inertia of the hybrid type vehicle.

At this time, the planetary gear unit 13 receives the motor torque TM1 and the engine torque TE, and receives the output torque TO and the motor torque TM2 as reaction forces, as indicated in FIG. 12. Then, as indicated by a state I in FIG. 12, the motor torque TM1 assumes a value obtained by adding the first inertia torque IM1 to the target motor torque TM1*. As indicated by a state J, the motor torque TM2 assumes a value obtained by adding the second inertia torque IM2 to the control motor torque TM2#.

The direction in which the motor torque TM2 acts on the planetary gear unit 13 is different from the direction of the motor rotation speed NM2, so that the second electric motor 25 generates electric power.

If, from the state indicated by a broken line ϵ2 in FIG. 13, the engine revolution speed NE is decreased by easing the accelerator pedal so that the rotation speed becomes as indicated by the solid line in FIG. 13, the motor rotation speed NM1 becomes higher as indicated by a broken-line arrow F in FIG. 13, and the motor rotation speed NM2 becomes lower as indicated by a broken-line arrow H, as the output rotation speed NO is not changed by the inertia of the hybrid type vehicle. In this case, similar to the aforementioned occasion, the planetary gear unit 13 receives the motor torque TM1 and the engine torque TE, and receives the output torque TO and the motor torque TM2 as reaction forces, as indicated in FIG. 12.

Then, as indicated by a state K in FIG. 12, the motor torque TM1 assumes a value obtained by subtracting the first inertia torque IM1 from the target motor torque TM1*. As indicated by a stale L, the motor torque TM2 assumes a value obtained by subtracting the second inertia torque IM2 from the control motor torque TM2#. In this case, too, the direction in which the motor torque TM2 acts on the planetary gear unit 13 is different from the direction of the motor rotation speed NM2, so that the second electric motor 25 generates electric power.

Next a torque diagram and a rotation speed diagram in connection with a case where the second electric motor 25, having been driven in a forward direction, is driven in the reverse direction while the engine 11 is held in a stopped state, that is, the case of reverse driving will be described.

Figure 14:
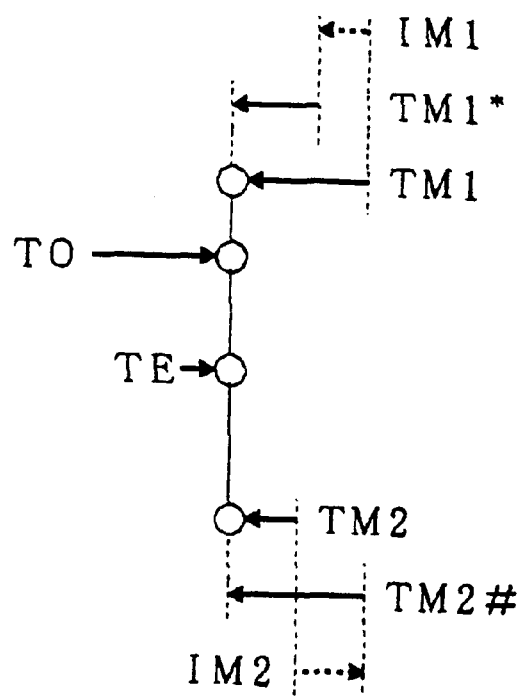
FIG. 14 is a torque diagram in connection with reverse drive in the first embodiment of the invention.
Figure 15:
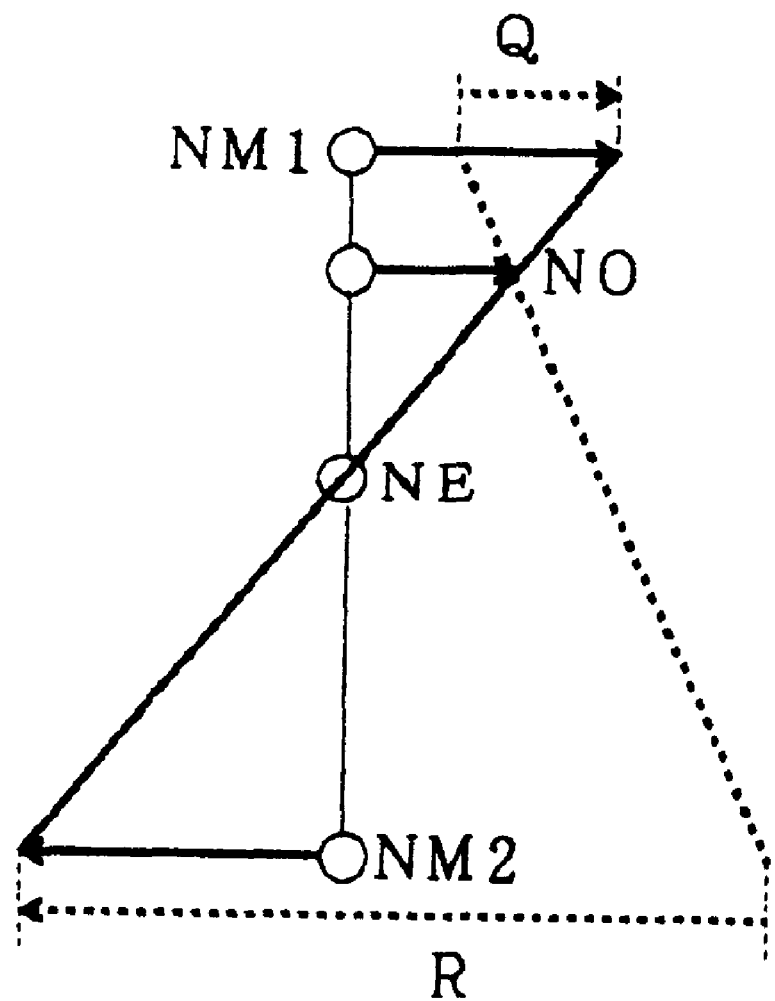
FIG. 15 is a rotation speed diagram in connection with reverse drive in the first embodiment of the invention.

FIG. 14 is a torque diagram in connection with reverse driving in accordance with the first embodiment of the invention. FIG. 15 is a rotation speed diagram in connection with reverse driving in accordance with the first embodiment of the invention.

When the hybrid type vehicle is slip-driven by driving the engine 11 (FIG. 2) and the first electric motor 16, the rotation speed line becomes as indicated by the broken line in FIG. 15, so that the motor rotation speeds NM1, NM2, the output rotation speed NO and the engine revolution speed NE assume positive values.

If in this state, the engine 11 is stopped and the second electric motor 25 is driven in the reverse direction so that the rotation speed line becomes as indicated by the solid line in FIG. 15, the motor rotation speed NM1 becomes higher as indicated by a broken-line arrow Q, and the motor rotation speed NM2 becomes lower and assumes a negative value as indicated by a broken-line arrow R.

In this case, the planetary gear unit 13 receives the motor torques TM1, TM2, and receives the output torque TO and the engine torque TE as reaction forces, as indicated in FIG. 14.

Then, the motor torque TM1 assumes a value obtained by adding the first inertia torque IM1 to the target motor torque TM1*, and the motor torque TM2 assumes a value obtained by subtracting the second inertia torque IM2 from the control motor torque TM2#.

In this case, the direction in which the motor torque TM2 acts on the planetary gear unit 13 is the same as the direction of the motor rotation speed NM2, so that the second electric motor 25 does not generate electric power.

Figure 16:
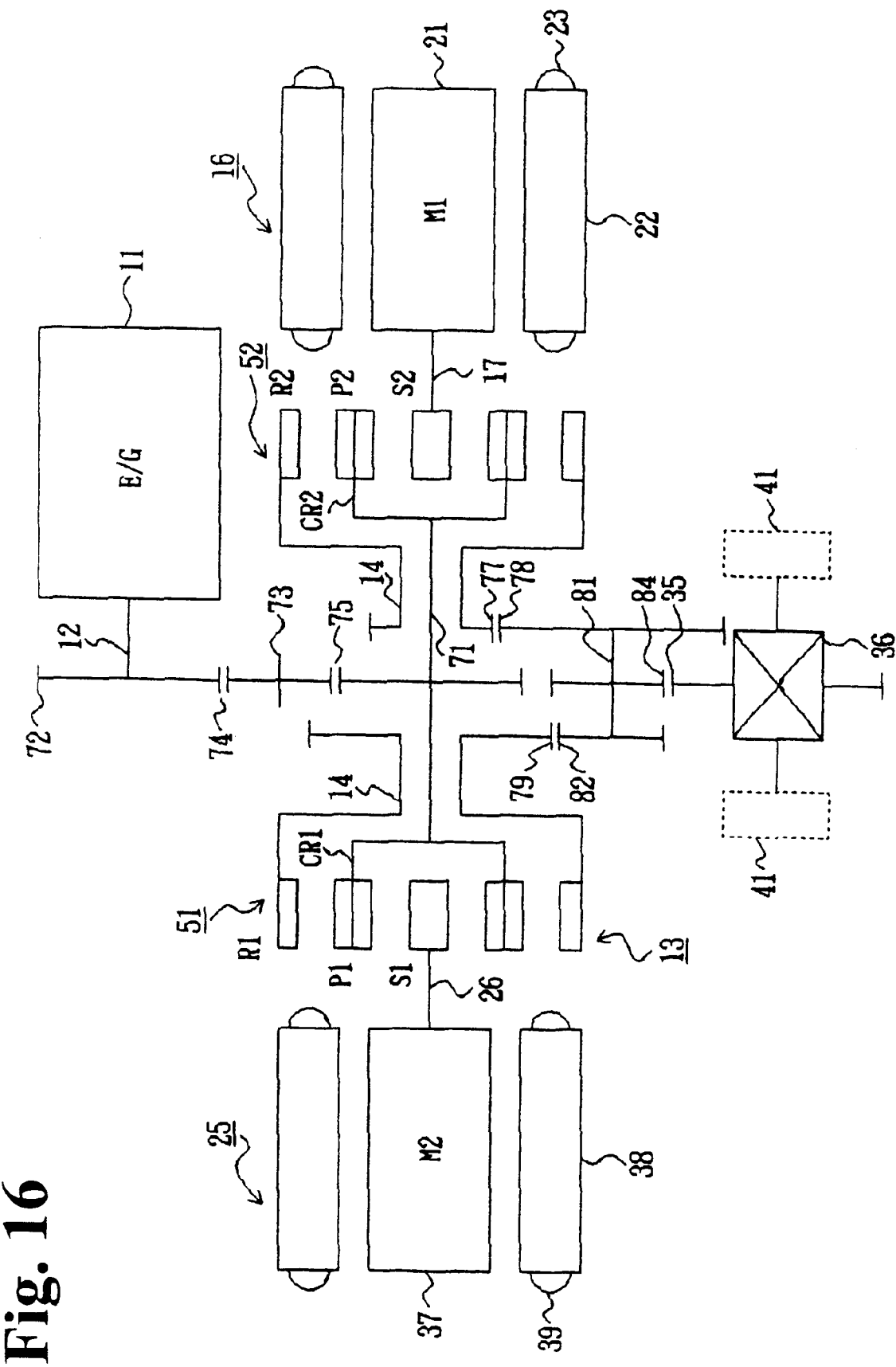
FIG. 16 is a conceptual diagram of a hybrid type vehicle in accordance with a second embodiment of the invention.

Next, a second embodiment of the invention will be described. Portions having the same structure as those of the first embodiment are represented by the same reference characters in the drawing concerned, and will not be described again. FIG. 16 is a conceptual diagram of the hybrid vehicle in accordance with the second embodiment of the invention.

In this case, in the planetary gear unit 13, as a differential gear device, carriers CR1, CR2 as first gear elements are connected via a driven shaft 71. An engine (E/G) 11 and the carriers CR1, CR2 are connected. A first electric motor (M1) 16 and a sun gear S2 as a second gear element are connected. A second electric motor (M2) 25 and a sun gear S1 as a third gear element are connected. An output shaft 14 and ring gears R1, R2 as a fourth gear element are connected.

For the connections, the engine 11, the first electric motor 16 and the second electric motor 25 are provided with an output shaft 12, an output shaft 17 and a transmission shaft 26, respectively. The output shaft 12 and the carriers CR1, CR2 are connected via a drive gear 72 attached to the output shaft 12, a counter gear 74 disposed rotatably with respect to a counter shaft 73 and that is meshed with the drive gear 72, and a driven gear 75 meshed with the counter gear 74. The output shaft 17 and the sun gear S2 are connected. The transmission shaft 26 and the sun gear S1 are connected.

In order to rotate the drive wheels 41 in the same direction as the revolution of the engine 11, counter drive gears 77, 79 are attached to the output shaft 14. Counter driven gears 78, 82 and a pinion drive gear 84 are fixed to a counter shaft 81. The counter drive gears 77, 79 are meshed with the counter driven gears 78, 82, respectively. A large ring gear 35 is fixed to a differential device 36. The pinion drive gear 84 and the large ring gear 35 are meshed.

Figure 17:
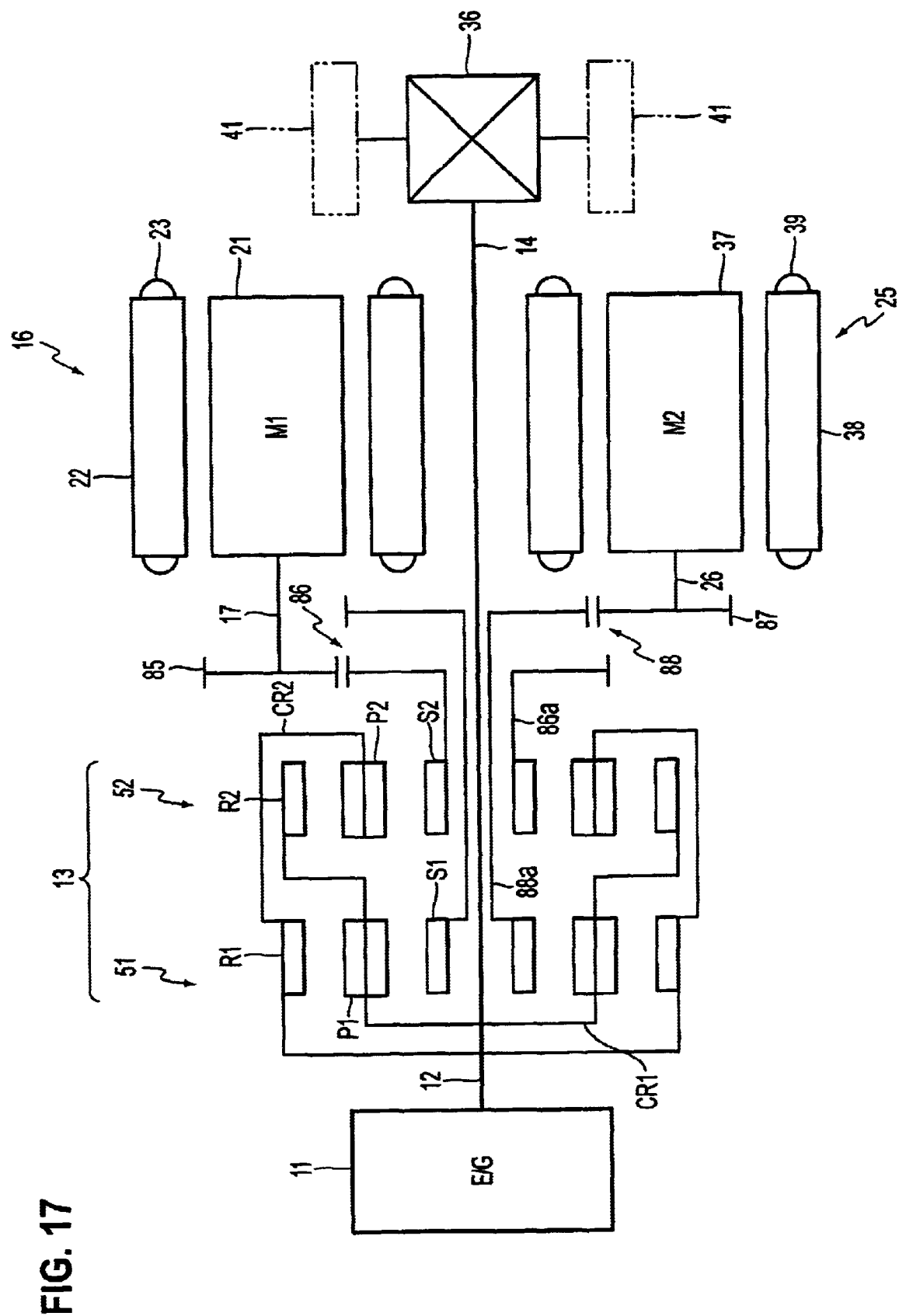
FIG. 17 is a conceptual diagram of a hybrid type vehicle in accordance with a third embodiment of the invention.

Next, a third embodiment of the invention will be described. Portions having the same structure as the first embodiment are represented by the same reference characters in the drawing concerned, and will not be described again. FIG. 17 is a conceptual diagram of a hybrid vehicle in accordance with the third embodiment of the invention.

In this case, in the planetary gear unit 13 as a differential gear device, a carrier CR1 and a ring gear R2 are connected, and a ring gear R1 and a carrier CR2 are connected. An engine (E/G) 11, and the ring gear R1 and the carrier CR2 as a first gear element are connected. A first electric motor (M1) 16 and a sun gear S2 as a second gear element are connected. A second electric motor (M2) 25 and a sun gear S1 as a third gear element are connected. An output shaft 14, and the carrier CR1 and the ring gear R2 as a fourth gear element are connected.

For the connections, the engine 11, the first electric motor 16 and the second electric motor 25 are provided with an output shaft 12, an output shaft 17 and a transmission shaft 26, respectively. The output shaft 12 and the ring gear R1 are connected. The output shaft 17 and the sun gear S2 are connected via a drive gear 85 attached to the output shaft 17, and a driven gear 86 attached to the sun gear S2. The transmission shaft 26 and the sun gear S1 are connected via a drive gear 87 attached to the transmission shaft 26, and a driven gear 88 attached to the sun gear S1.

The driven gears 86, 88 have sleeve portions 86a, 88a, respectively. The output shaft 14 is surrounded by the sleeve portion 88a. The sleeve portion 88a is surrounded by the sleeve portion 86a.

The second and third embodiments differ from the first embodiment in the structure of the planetary gear unit 13, and the connection relationships of the engine 11, the fist and second electric motors 16, 25, and the output shaft 14 with respect to the planetary gear unit 13. Therefore, the control method in the first embodiment can be adapted to the second and third embodiments in the following manner. That is, in the equation for calculating the target motor rotation speed NM2* by the second motor control processing means MS3, and in the equation for calculating the target motor torque TM1* by the target control torque calculation processing means 93 of the first motor control processing means MS4, the constants are changed, and the positive/negative signs are reversed.

As described in detail above, in accordance with the invention, the hybrid vehicle control apparatus includes an engine; a first and a second electric motor; an output shaft connected to a drive wheel; a differential gear device having at least four gear elements that are connected to the engine, the first and second electric motors and the output shaft, respectively; generated control torque calculation processing means for calculating a control torque generated in association with an electrical control of the second electric motor; inertia torque calculation processing means for calculating first and second inertia torques occurring in association with changes in motor rotation speeds of the first and second electric motors; target control torque calculation processing means for calculating a control torque serving as a target for performing an electrical control of the first electric motor, based on the control torque and the first and second inertia torques; and torque control processing means for performing a torque control of the first electric motor in accordance with the control torque serving as the target.

In this case, based on the control torque and the first and second inertia torques, a control torque serving as a target for performing the electrical control of the first electric motor is calculated. Therefore, the control torque can be calculated without being affected by the first and second inertia torques occurring in association with changes in the rotation speeds of the first and second electric motors.

As a result, the drive feeling of the hybrid vehicle will not deteriorate when the rotation of one gear element of the gear elements of the differential gear device changes.

Although the invention has been described with reference to what are presently considered to be preferred embodiments thereof, it is to be understood that the invention is not limited to the disclosed embodiments or structures. To the contrary, the invention is intended to cover various modifications and equivalent arrangements.

What is claimed is:

1. A hybrid vehicle control apparatus, comprising:
a first electric motor;
a second electric motor;
an output shaft connected to a drive wheel;
a differential gear device having at least four gear elements that are connected to an engine, the first and second electric motors, and the output shaft, respectively;
generated control torque calculation processing means for calculating a control torque generated in association with an electrical control of the second electric motor;
inertia torque calculation processing means for calculating first and second inertia torques occurring in association with changes in motor rotation speeds of the first and second electric motors;
target control torque calculation processing means for calculating a control torque as a target for performing an electrical control of the first electric motor, based on the control torque and the first and second inertia torques; and torque control processing means for performing a torque control of the first electric motor in accordance with the control torque as the target.

2. The hybrid vehicle control apparatus according to claim 1, further comprising:
target engine revolution speed calculation processing means for calculating a target engine revolution speed of the engine; and
rotation speed control processing means for performing a rotation speed control of the second electric motor such that an engine revolution speed becomes equal to the target engine revolution speed.

3. The hybrid vehicle control apparatus according to claim 2, wherein if the target engine revolution speed is NE* and a vehicle speed is V, a target motor rotation speed NM2* is given as:

NM2*=K1·*NE**-K2·*V* (K1, K2: constants).

4. The hybrid vehicle control apparatus according to claim 1, wherein the first inertia torque is calculated by multiplying an inertia moment of a rotor of the first electric motor by an angular acceleration of the first electric motor, and the second inertia torque is calculated by multiplying an inertia moment of a rotor of the second electric motor by an angular acceleration of the second electric motor.

5. A hybrid vehicle control apparatus, comprising:
a first electric motor;
a second electric motor;
an output shaft connected to a drive wheel;
a differential gear device having at least four gear elements that are connected to an engine, the first and second electric motors, and the output shaft, respectively;
generated control torque calculation processing means for calculating a control torque generated in association with an electrical control of the second electric motor;
inertia torque calculation processing means for calculating a first inertia torque that occurs in rotational elements from a rotor of the first electric motor to a gear element of the differential gear device in association with a change in a motor rotation speed of the first electric motor, and a second inertia torque that occurs in rotational elements from a rotor of the second electric motor to a gear element of the differential gear device in association with a change in a motor rotation speed of the second electric motor;
target control torque calculation processing means for calculating a control torque as a target for performing an electrical control of the first electric motor, based on the control torque and the first and second inertia torques; and
torque control processing means for performing a torque control of the first electric motor in accordance with the control torque as the target.

6. The hybrid vehicle control apparatus according to claim 5, further comprising:
target engine revolution speed calculation processing means for calculating a target engine revolution speed of the engine; and
rotation speed control processing means for performing a rotation speed control of the second electric motor such that an engine revolution speed becomes equal to the target engine revolution speed.

7. The hybrid vehicle control apparatus according to claim 6, wherein if the target engine revolution speed is NE* and a vehicle speed is V, a target motor rotation speed NM2* is given as:

NM2*=K1·*NE**-K2·*V* (K1, K2: constants).

8. The hybrid vehicle control apparatus according to claim 5, wherein the first inertia torque is a sum of values obtained by multiplying inertia moments of the rotational elements from the rotor of the first electric motor to the gear element of the differential gear device by angular accelerations of the rotational elements, respectively, and the second inertia torque is a sum of values obtained by multiplying inertia moments of the rotational elements from the rotor of the second electric motor to the gear element of the differential gear device by angular accelerations of the rotational elements, respectively.

9. The hybrid vehicle control apparatus according to claim 8, wherein if the control torque generated in association with the electrical control of the second electric motor is TM2# and the first inertia torque is IM1, the second inertia torque is IM2, and the target output torque is TO*, the target motor torque TM1* is given as:

TM1*=K3(TM2#+IM2)-K4·*TO**-IM1 (K3, K4: constants).

10. A hybrid vehicle control apparatus, comprising:
a first electric motor;
a second electric motor;
an output shaft connected to a drive wheel;
a differential gear device having at least four gear elements that are connected to an engine, the first and second electric motors, and the output shaft, respectively;
target output torque calculation processing means for calculating a target output torque of an output torque outputted to the output shaft;
generated control torque calculation processing means for calculating a control torque generated in association with an electrical control of the second electric motor;
inertia torque calculation processing means for calculating first and second inertia torques occurring in association with changes in motor rotation speeds of the first and second electric motors;
target control torque calculation processing means for calculating, based on the control torque and the first and second inertia torques, a control torque as a target for performing an electrical control of the first electric motor so as to enable the target output torque to be outputted to the output shaft; and
torque control processing means for performing a torque control of the first electric motor in accordance with the control torque as the target.

11. The hybrid vehicle control apparatus according to claim 10, further comprising:
target engine revolution speed calculation processing means for calculating a target engine revolution speed of the engine; and
rotation speed control processing means for performing a rotation speed control of the second electric motor such that an engine revolution speed becomes equal to the target engine revolution speed.

12. The hybrid vehicle control apparatus according to claim 11, wherein if the target engine revolution speed is NE* and a vehicle speed is V, a target motor rotation speed NM2* is given as:

NM2*=K1·*NE**-K2·*V* (K1, K2: constants).

13. The hybrid vehicle control apparatus according to claim 10, wherein the first inertia torque is calculated by multiplying an inertia moment of a rotor of the first electric motor by an angular acceleration of the first electric motor, and the second inertia torque is calculated by multiplying an inertia moment of a rotor of the second electric motor by an angular acceleration of the second electric motor.

14. A hybrid vehicle control apparatus, comprising:

a first electric motor;

a second electric motor;

an output shaft connected to a drive wheel;

a differential gear device having at least four gear elements that are connected to an engine, the first and second electric motors, and the output shaft, respectively;

target output torque calculation processing means for calculating a target output torque of an output torque outputted to the output shaft;

generated control torque calculation processing means for calculating a control torque generated in association with an electrical control of the second electric motor;

inertia torque calculation processing means for calculating a first inertia torque that occurs on rotational elements from a rotor of the first electric motor to a gear element of the differential gear device in association with a change in a motor rotation speed of the first electric motor, and a second inertia torque that occurs on rotational elements from a rotor of the second electric motor to a gear element of the differential gear device in association with a change in a motor rotation speed of the second electric motor;

target control torque calculation processing means for calculating, based on the control torque and the first and second inertia torques, a control torque as a target for performing an electrical control of the first electric motor so as to enable the target output torque to be outputted to the output shaft; and torque control processing means for performing a torque control of the first electric motor in accordance with the control torque as the target.

15. The hybrid vehicle control apparatus according to claim 14, further comprising:

target engine revolution speed calculation processing means for calculating a target engine revolution speed of the engine; and rotation speed control processing means for performing a rotation speed control of the second electric motor such that an engine revolution speed becomes equal to the target engine revolution speed.

16. The hybrid vehicle control apparatus according to claim 15, wherein if the target engine revolution speed is $NE^*$ and a vehicle speed is V, a target motor rotation speed $NM2^*$ is given as:

$$NM2^* = K1 \cdot NE^* - K2 \cdot V \quad (K1, K2: \text{constants}).$$

17. The hybrid vehicle control apparatus according to claim 14, wherein the first inertia torque is a sum of values obtained by multiplying inertia moments of the rotational elements from the rotor of the first electric motor to the gear element of the differential gear device by angular accelerations of the rotational elements, respectively, and the second inertia torque is a sum of values obtained by multiplying inertia moments of the rotational elements from the rotor of the second electric motor to the gear element of the differential gear device by angular accelerations of the rotational elements, respectively.

18. The hybrid vehicle control apparatus according to claim 17, wherein if the control torque generated in association with the electrical control of the second electric motor is $TM2\#$ and the first inertia torque is IM1 and the second inertia torque is IM2 and the target output torque is $TO^*$, the target motor torque $TM1^*$ is given as:

$$TM1^* = K3(TM2\# + IM2) - K4 \cdot TO^* - IM1 \quad (K3, K4: \text{constants}).$$

19. A control method for a hybrid vehicle having a first electric motor and a second electric motor; an output shaft connected to a drive wheel; and a differential gear device having at least four gear elements that are connected to an engine, the first and second electric motors, and the output shaft, respectively, the control method for the hybrid type vehicle comprising:

calculating a control torque generated in association with an electrical control of the second electric motor;

calculating first and second inertia torques occurring in association with changes in motor rotation speeds of the first and second electric motors;

calculating a control torque as a target for performing an electrical control of the first electric motor, based on the control torque and the first and second inertia torques; and performing a torque control of the first electric motor in accordance with the control torque as the target.

* * * * *